March 31, 1936.  A. R. PRIBIL  2,035,669
TRAILER HITCH BRACKET
Filed June 28, 1935
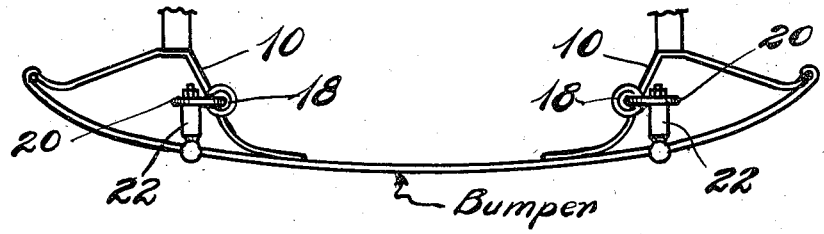
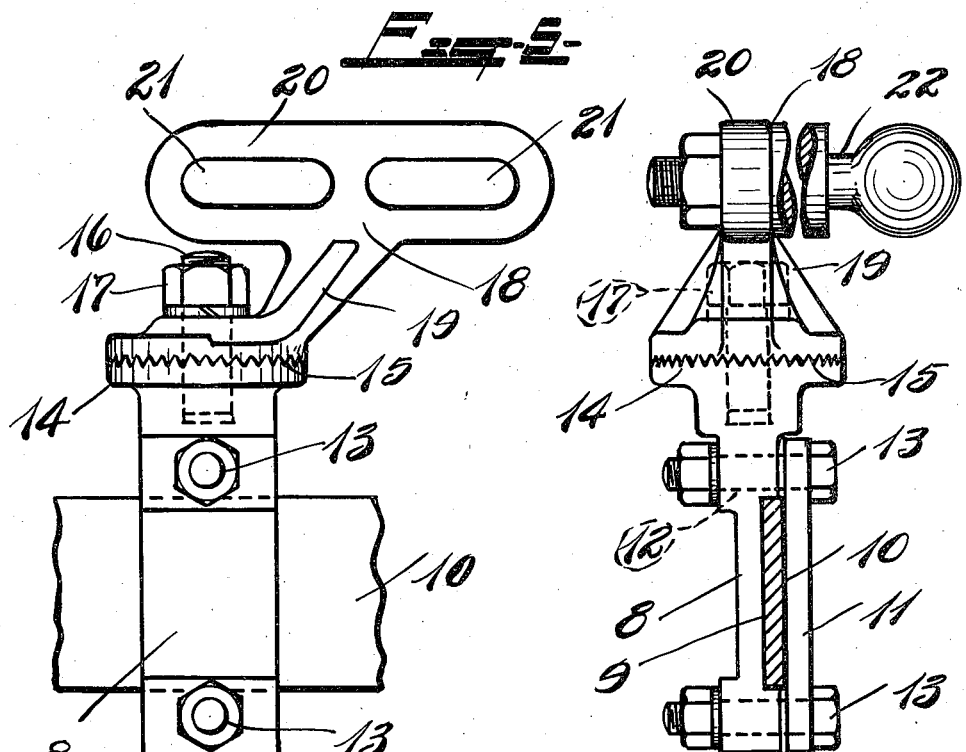
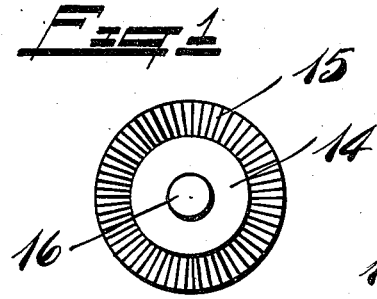
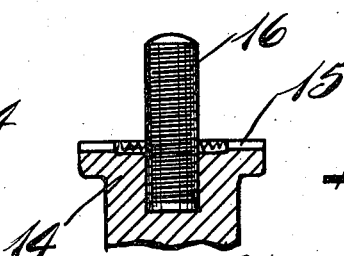
INVENTOR.
Alexis R. Pribil.
BY Frank C. Seaman.
ATTORNEY.

Patented Mar. 31, 1936

2,035,669

UNITED STATES PATENT OFFICE 2,035,669

TRAILER HITCH BRACKET

Alexis R. Pribil, Saginaw, Mich.

Application June 28, 1935, Serial No. 28,829

2 Claims. (Cl. 280—33.44)

This invention relates to brackets of the type used to connect trailers to motor driven vehicles and the like, and more specifically to a universal bracket which can be attached to any shape or design of bumper or vehicle frame.

One of the prime objects of the invention is to design a bracket which can be readily attached to any desired portion of the bumper or bumper bar attachment, and which is fully universal so that it can be readily adjusted to permit attachment of the ball bolt and to suit the angle of pull.

Another object is to provide a relatively simple, practical, and economical bracket, which is of neat and pleasing appearance, which can be mounted to project above or below the bumper proper, which can be readily installed and used without marring or defacing the bumper, which requires no holes to be drilled, and which is adjustable so that it provides for an even, straight line pull.

With the above and other objects in view, the present invention consists in the combination and arrangement of parts, hereinafter more fully described, illustrated in the accompanying drawing, and particularly pointed out in the appended claims, it being understood that changes may be made in the form, size, proportion, and minor details of construction, without departing from the spirit, or sacrificing any of the advantages of the invention.

In the drawing—

Fig. 1 is a side view of my improved bracket, showing it mounted on a bumper.

Fig. 2 is an edge view showing the ball bolt secured thereto, the bumper being shown in section.

Fig. 3 is a fragmentary sectional view showing the stud in position.

Fig. 4 is a detail plan view of the parts shown in Fig. 3.

Fig. 5 is a plan view of a bumper assembly with the brackets mounted thereon.

Trailer hitch brackets such as shown in the accompanying drawing are primarily designed for use with trailers which have two connections to the power or driven vehicle, and inasmuch as the shape, form, and curvature of the various bumper supports vary considerably, it is necessary to provide means for adjustment so that the pull or draft will be straight, otherwise the brackets would be special for each make and design of vehicle, the bumper might be bent and twisted, and likewise the attachment would be subjected to tortional twisting strains.

As previously described, the bracket can be mounted to depend below, or it can be mounted to project above the bumper and as shown in the accompanying drawing in which the numeral 8 indicates the clamp end of the bracket, one face of which is recessed and shouldered as at 9 to receive and accommodate the bumper bar attachment 10, a flat plate 11 fitting over said bar, and openings 12 are provided in the bar and bracket to accommodate bolts 13 for rigidly clamping the bracket to the bumper attachment.

The projecting end of the member 8 terminates in a disc shaped section 14, the upper face of which is toothed as shown at 15, and for a purpose to be presently described, a centrally disposed stud 16 being cast-welded in the member, and projects above the toothed face of the disc, the upper end being threaded to receive a nut 17 as usual.

An extension member 18 is mounted on the section 14 and is formed and toothed in a similar manner, being centrally bored to accommodate the stud 16, and the nut 17 serves to rigidly secure them in adjusted position. A rib or neck 19 forms a part of the extension 18 and terminates in an elongated section 20 in which the spaced apart slotted openings 21 are cast, these openings being slotted to provide a greater range for attachment.

It will be noted that the extension or free end of the bracket can be revolved to any desired position—it is merely necessary to remove the nut 17, and the extension 18 can be adjusted to any desired position; consequently, it will be obvious that the angle of the bar attachment is immaterial, because the extension 18 can be adjusted in any desired direction to suit and permit attachment of the ball bolt 22 which forms part of the universal ball connection.

Considerable variance might be found in the spacing of the draft bars which lead from the trailer, and the slotted openings provide for the necessary range of adjustment.

From the foregoing description it will be obvious that I have perfected a very simple, substantial, and practical trailer hitch bracket, which is fully universal, and which can be attached to any vehicle frame or bumper mounting.

What I claim is:

1. A trailer hitch bracket of the class described and comprising a bracket having a depending leg adapted to accommodate a vehicle bumper, the upper end of said bracket being disc shaped and toothed, an extension member mounted on the bracket and formed with a similarly toothed end meshing with the toothed face of the bracket, an offset section formed integral with the extension and provided with slotted openings adapted to receive a ball bolt, a bar cooperating with the leg of the bracket, and means for clamping said bar in position.

2. A trailer hitch bracket of the class described and comprising a bracket member formed with a recessed face adapted to accommodate a vehicle bumper, said bracket terminating in a disc shaped end provided with teeth on the face thereof, a stud projecting from said disc, an extension member mounted on said bracket and formed with a similar disc shaped toothed end adapted to accommodate said stud, an offset section formed integral with the extension and provided with spaced apart slotted openings adapted to accommodate a ball bolt, a flat bar cooperating with the recessed face of the bracket, and bolts for securing said bar to the bracket and clamping a bumper therebetween.

ALEXIS R. PRIBIL.